Feb. 15, 1966  J. H. ROBSON  3,235,254
MOBILE TRAINING DEVICE FOR SKATERS
Filed Feb. 14, 1963  2 Sheets-Sheet 1
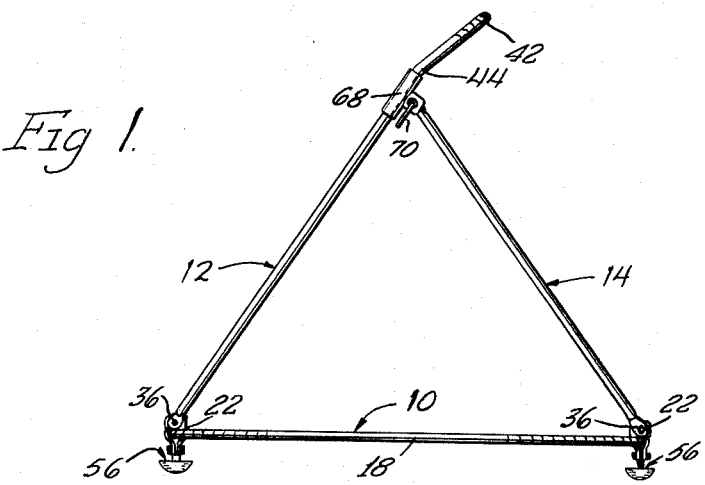
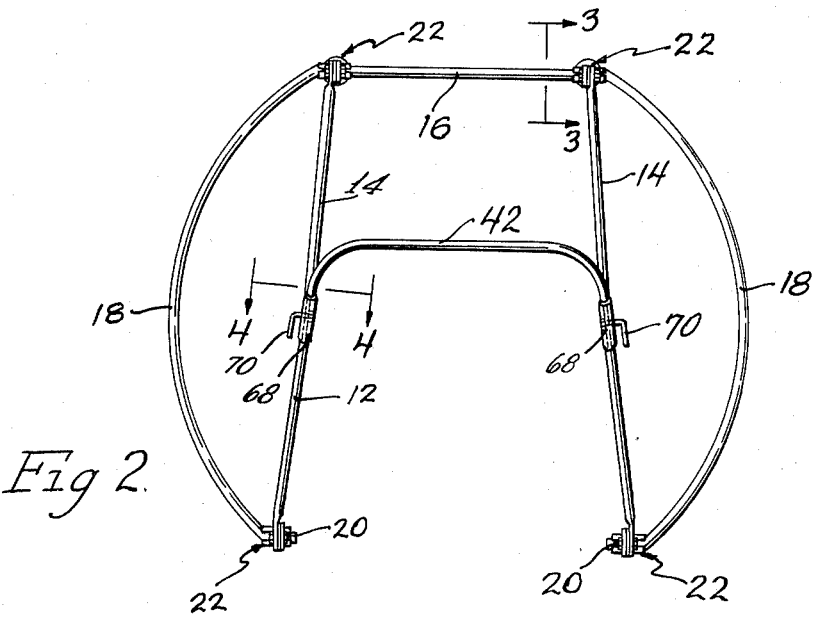
INVENTOR.
John H. Robson

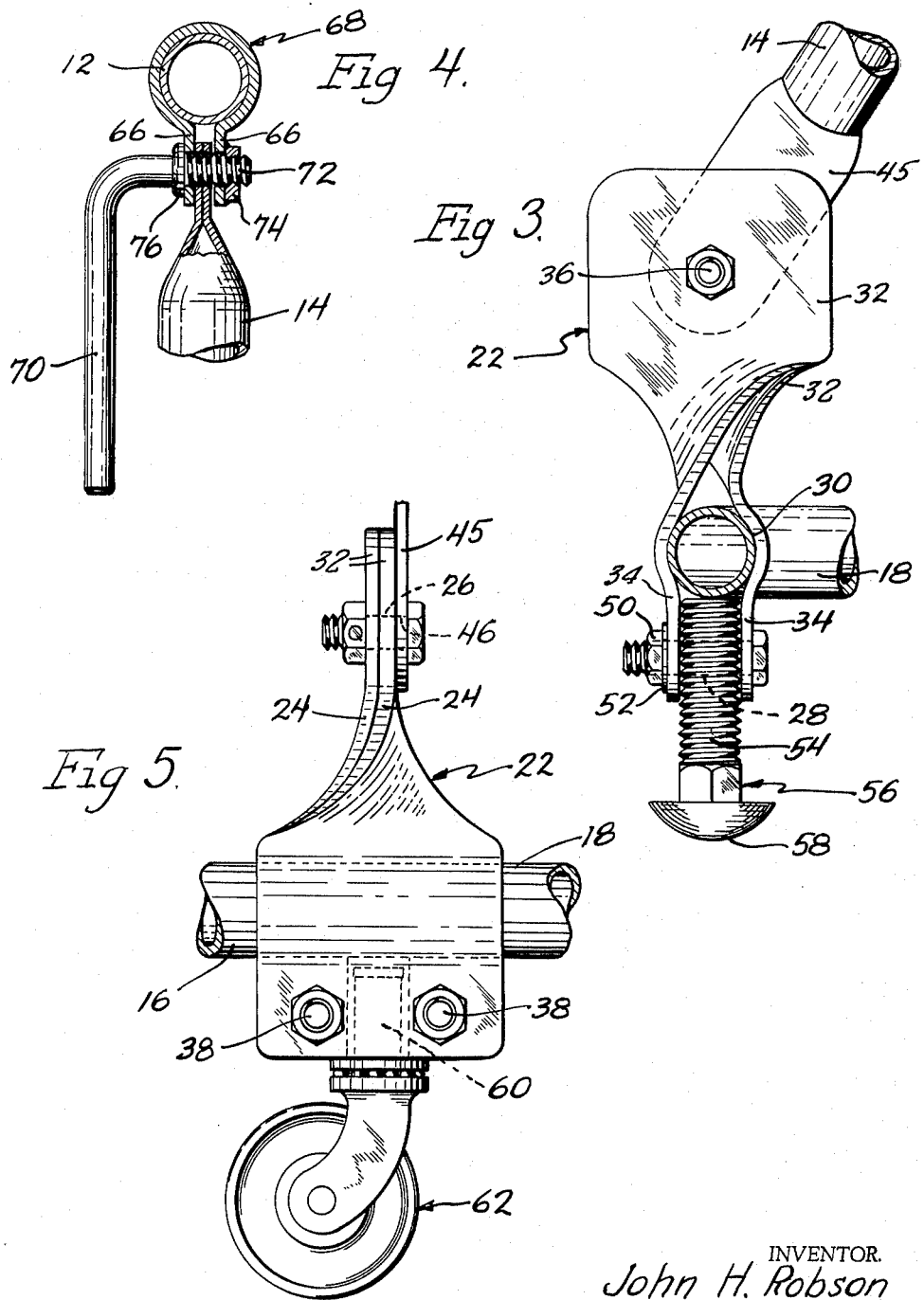

United States Patent Office 3,235,254
Patented Feb. 15, 1966

3,235,254
MOBILE TRAINING DEVICE FOR SKATERS
John H. Robson, Rte. 1, Box 441, Crystal Lake, Ill.
Filed Feb. 14, 1963, Ser. No. 259,032
7 Claims. (Cl. 272—70.3)

The present invention relates to teaching aids for children and more particularly to an aid which assists children in learning how to skate both with roller and ice skates.

In learning to skate it is important that the student have no fear of falling. Prior to the time that very young children acquire a fear of falling, learning to skate can be fun to them in a rough and tumble sort of a way without aids because they are relaxed and seldom hurt themselves when they fall. But after the age of three or four most children acquire a fear of falling and this causes a nervousness and tenseness on skates which leads to injuries and painful experiences when falls occur. Not only this, but nervousness, tenseness, and painful experiences delay the learning and very often discourage with bad memories the pursuit of the sport in later years.

Of prime importance, a skate aid should provide a student with a feeling of confidence against injurious falls. Such a confidence is derived from seeing and handling a device which gives adequate visible assurance against tipping and is sturdy enough to support a sufficient portion of the weight of a student to avoid or break a fall. The aid must be light and readily portable or it becomes such a physical burden or a cumbersome problem that its use may not be continued until full confidence and ability is attained.

Furthermore, the aid should be adjustable for a family of children and readily adaptable for all skaters and children of different sizes as well as inexpensive and easy for children to handle and adjust.

Accordingly, one of the objects of the present invention is to provide a learning aid for skating which is inexpensive to manufacture; easy to set up, adjust, and repair; easily understood and managed by all children; large enough to provide good support yet can be folded flat quickly for transportation in a two seated car or station wagon; and will instill confidence of adequate support throughout the learning period to relax the student without being a burden on his efforts.

These being among the objects of the invention other and further objects will become apparent from the description and the drawings related thereto wherein like numerals refer to like parts:

FIG. 1 is a side elevation of an erected device embodying the invention,
FIG. 2 is a plan view of the device shown in FIG. 1,
FIG. 3 is a section taken on line 3—3 in FIG. 2,
FIG. 4 is a section taken on line 4—4 in FIG. 2, and,
FIG. 5 shows an adaptation for roller skating.

Referring now to the drawings in further detail, a skating aid is shown having a base 10, a handle 12 and adjustable braces 14 to elevate and position the handle.

The base is preferably made of tubular metal similar to electrical wiring conduit which is often referred to as "thin wall." A central section is left straight across the front of the frame as at 16 and the remaining end portions are bent to provide circular sections at 18 which terminate in spaced end portions 20 bent into alignment with each other and parallel to the front section 16.

At the ends of the straight portion 16 and on the end portions 20 are mounted assemblies 22 which are identical and preferably made each with two identical stampings as more particularly shown in FIGS. 3 and 5 for clamping on the base and providing widespread weight and supporting points.

In manufacturing the members of the clamp assemblies, heavy sheet metal is stamped into figure 8 pieces 24 with a single hole 26 in the top portion or end 32 and two spaced holes 28 in the lower portion or end 34. The lower end portion is also concavely rounded as at 30 to engage the base 10 in clamping relationship. The top end 32 is twisted at right angles to the bottom end 34 and it will be observed that any two stampings can be paired as pivotally secured by bolt 36 through the holes 26 so that the lower ends swing outwardly to be received astraddle the base 10 where they can be clamped in place by bolts 38 inserted through holes 28.

The handle 12 is a U-shaped tubular member shaped as shown in the drawings with its connected front portion 42 bent downwardly slightly as at 44. As shown in FIG. 5 the ends are flattened as at 45 and apertured as at 46 to receive the bolt 36 for pivotal movement at the rear ends 20 of the base member 10. Once the flattened ends are pivotally assembled, the lower ends 34 of the clamp assemblies are swung away from each other, placed over the base at 20 and brought towards each other to engage the base 10. The bolts 38 are then inserted to receive nut locks 52 and nuts 50. The handle 42 is thus pivotally mounted for movement from the upper position shown in FIG. 1 to as position flat against the base 10 (not shown) for carrying.

As these nuts 50 and bolts 38 are tightened, the unthreaded or threaded shank 54 of a carriage bolt 56 or blank is slipped into place as shown in FIG. 3 and such is clamped in supported relation at the same time that the lower ends are tightened against the base. The rounded heads 58 of the carriage bolts 56 provide glide elements for ice skating.

If desired for roller skating, the shank 60 of a caster wheel 62 can be inserted instead of a shank 54. In either case universal movement in all horizontal directions is available on ice with either support and upon land with the caster support.

In order to support the handle at any adjusted height, the tubular braces 14 are employed which are flattened at both ends in a common plane. At their front ends as at 45, they are apertured and pivotally mounted on bolts 36 at the front end of the base 10.

The other flattened ends of the braces are received between the flanges 66 of a C-clamp 68 that is slidable along the legs of the U-shaped handle 12, as shown in FIG. 4. The C-clamp is tightened and loosened by an L-shaped bolt member 70, threaded as at 72 to engage nut 74 at one end and provided with a shoulder 76 spaced therefrom to draw the flanges towards each other. Easy movement of the bolt 70 locates the clamp. The brace 14 being pivotally received on the threaded portion 72 of the bolt moves with the clamp to locate the handle 42 accordingly.

It will be observed that the number of different parts inventoried to build the device described is greatly reduced because of identicalness and interchangeability as already mentioned. This reduces manufacturing tool-up costs and also assembly time as well as repair and replacement of parts if ever required. Also, the main elements are easily made out of rugged tubular parts and all assembly can be made by persons unskilled mechanically without need for any particular sequential step relationship.

Consequently, it will be seen how the various objects of the invention are attained and how all pivotal axes are either coincident or disposed parallel for ease of operation without undue binding even if the clamps might become a little displaced in use.

What is claimed is:

1. A skating aid comprising a tubular member bent to form a base having an intermediate portion providing aligned spaced intermediate portions at the front and terminating in aligned spaced rear end portions parallel with said intermediate portions to encompass a skating area, clamping means including two vertically disposed clamp elements engaging opposite sides of each of said portions, pivot pin means disposed parallel to said portions and pivotally connecting together said two clamp elements above each of the respective portions, means interconnecting said two clamp elements for drawing them towards each other below each of the respective portions, a U-shaped handle member pivotally mounted at the free ends of its leg portions upon the respective pivot pin means disposed above said rear end portions, brace members pivotally mounted at their lower ends to the pivot pin means disposed above said spaced front portions, and clamping means pivotally secured on each of the other ends of each of said brace members and slidably engaging each of the leg portions of the U-shaped member in adjustable clamped relationship to support the handle portion of the U-shaped member a variable spaced distance above said front intermediate portions of the base.

2. The combination called for in claim 1 in which said two vertically disposed clamp elements are identical heavy sheet metal stampings each with their top and bottom portions disposed at right angles to each other.

3. A skating aid comprising a tubular member bent to form an integral U-shape base having an intermediate front portion providing aligned transversely spaced front portions with the end portions rounded outwardly and rearwardly to define a skating area for foot movement of the skater and terminating in transversely spaced rear end portions aligned parallel with the alignment of the spaced front portions of said intermediate portion, means secured to said front portions of the base at each end of the intermediate portion and on each one of the rear end portions including pivot pins disposed above the respective portions and parallel to the alignments of said portions, a U-shaped handle member for skaters pivotally mounted at its ends upon the pivot pins above said rear end portions for movement up and down at its front end and having straight parallel legs, brace members each pivotally mounted at one end to one of the forward pivot pins above the straight portion, and each of said brace members terminating at its other end in clamping means slidable along the straight legs of the U-shaped handle member in adjustable clamped relationship therewith and including aligned pivot pins parallel with said forward pivot pins.

4. The combination called for in claim 3 including inverted convex headed members having a vertical shank portion held by each of the first-mentioned means.

5. The combination called for in claim 3 including caster wheels having vertical shanks held by each of the first-mentioned means.

6. The combination called for in claim 3 wherein the first mentioned means therein includes two depending clamp elements at each of said portions disposed on said portions and secured therebelow in clamping relationship therewith, and depending surface contacting means for universal movement in a horizontal plane supported at each of said clamping means between the clamp elements below said portions.

7. A skating aid comprising a tubular member bent to form a base having an intermediate portion providing aligned spaced intermediate portions at the front rounded outwardly and rearwardly therefrom to define a skating area for foot movement of the skater and terminating in aligned spaced rear end portions parallel with the alignment of said intermediate portions to encompass a skating area, securing means disposed at each of said portions and each including two depending elements secured below and engaging their respective portions, pivot means carried by each of said securing means including a pin disposed above and parallel to the alignments of said portions, a U-shaped member having a horizontal handle portion for skaters above the skating area and rearwardly extending depending straight parallel leg portions terminally mounted pivotally upon the pins located at said rear end portions, brace members each pivotally mounted at one end to one of the pins located at said intermediate portions, and each of said brace members terminating at its other end in clamping means pivotally secured on each of the other ends of said brace members and slidably engaging each of the leg portions of the U-shaped member in adjustable clamped relationship to support the handle portion of the U-shaped member for movement of said handle portion downwardly and forwardly to locate said handle portion a variable spaced distance above said front intermediate portions of the base.

References Cited by the Examiner

UNITED STATES PATENTS

| | | | |
|---|---|---|---|
| 1,436,802 | 11/1922 | Herold | 16—18 |
| 2,518,763 | 8/1950 | Du Bois | 135—45 |
| 2,594,051 | 4/1952 | McFarland et al. | 272—70.4 |
| 2,765,839 | 10/1956 | Arpin | 280—87.02 |
| 2,872,967 | 2/1959 | Kirkpatrick | 297—5 |
| 2,900,008 | 8/1959 | Seger | 272—57 |

FOREIGN PATENTS

| | | |
|---|---|---|
| 985,098 | 6/1951 | France. |
| 108,777 | 8/1917 | Great Britain. |

RICHARD C. PINKHAM, *Primary Examiner.*